Feb. 17, 1953     H. C. ORRICK, JR     2,628,657
SEAT CONSTRUCTION, ESPECIALLY FOR TRACTORS

Filed Nov. 6, 1947

INVENTOR.
HARRY C. ORRICK, JR.
BY
ATTORNEYS

WITNESS:

Patented Feb. 17, 1953

2,628,657

UNITED STATES PATENT OFFICE 2,628,657

SEAT CONSTRUCTION, ESPECIALLY FOR TRACTORS

Harry C. Orrick, Jr., Cedar Falls, Iowa, assignor, by mesne assignments, to Deere Manufacturing Co., a corporation of Iowa Application November 6, 1947, Serial No. 784,378

3 Claims. (Cl. 155—14)

This invention relates to a new and improved seat especially adapted for agricultural tractors and has for its principal object the provision of a seat construction pointing toward the safety, convenience and comfort of the operator.

Although great forward strides have been made in the past in the design of agricultural tractors, little, if any, attention has been paid to the improvement of the operator's station, particularly with respect to the provision of a comfortable and adjustable seat. According to the present invention the improved seat construction includes a support for an adjustable seat, provision being made for adjustment of the seat fore and aft so that operators of different statures may accommodate themselves to the tractor controls. It is an important feature of the invention to provide safety means incorporated in the adjusting means so that the seat cannot be inadvertently separated or displaced from the tractor, thereby preventing injury to the operator.

Another important object of the invention relates to means in the supporting structure providing a compartment or receptacle for the housing of a storage battery or the like. In the past starting and lighting equipment has not been provided as part of the regular equipment of the tractor and has usually been installed as an accessory. Inasmuch as the very nature of the tractor imposes considerable limitations upon the attachment of accessories, it was heretofore quite a problem to locate the storage battery and lamp on the tractor. According to the present invention the receptacle or compartment in the seat supporting structure provides an ideal location for the storage battery. The supporting structure is in the form of a box-like element, one wall of which provides means for supporting an electric lamp. The seat and supporting structure are so constructed and arranged that the seat provides a cover or closure for the compartment and during its adjusted position provides access to the compartment, thus providing for servicing of the storage battery in the compartment. Provision is made so that the seat may, as a practical matter, be separated from the compartment in only one direction; that is, forwardly toward the steering wheel, so that the operator must stop the tractor and dismount therefrom before he can completely remove the seat. Removal of the seat may be necessary or desirable in the event that it is desired to completely uncover the compartment for the purpose of removing the storage battery or other accessory that is carried therein, such as tools or the like.

The foregoing and other important objects and features of the invention will become apparent from a reading of the ensuing description, taken in conjunction with the accompanying sheet of drawings, wherein there is shown, by way of example, a preferred form of the invention.

Figure 1:
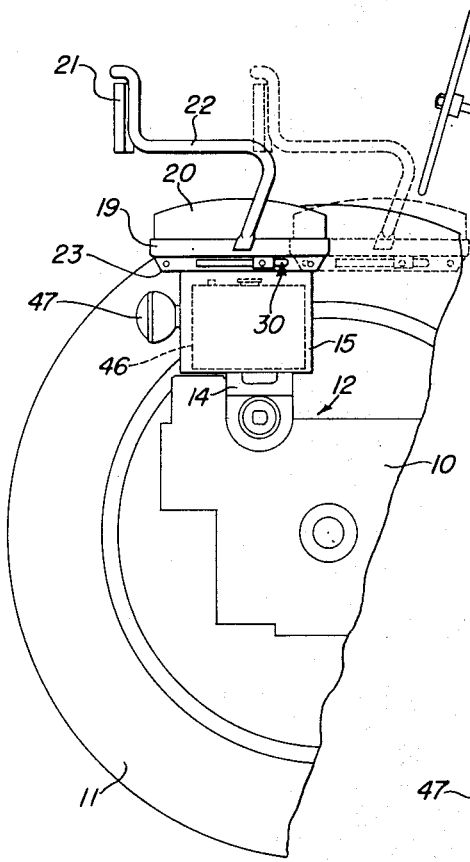
Figure 1 is a side elevational view of the rear portion of a tractor, the near wheel being removed to more clearly illustrate the seat and its supporting structure therefor.

The tractor chosen for the purposes of illustration is of a well known type comprising a longitudinal main body 10 carried on rear traction wheels 11, only one of which is illustrated in Figure 1. The rear portion of the tractor, as is conventional, is provided as an operator's station, designated here by the numeral 12, ahead of which is located a steering wheel 13. The operator's station includes a support 14 by means of which the improved seat construction is carried on the tractor.

Figure 3:
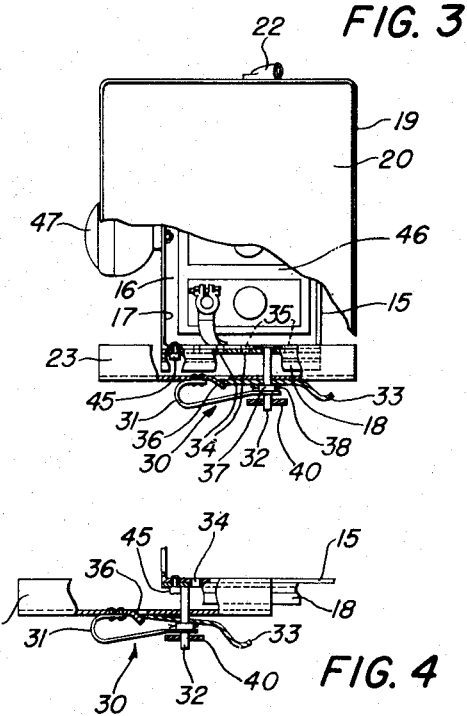
Figure 3 is a plan view, with portions thereof broken away, of the seat and support.

The supporting structure for the seat is designated by the numeral 15 and comprises a box-like element providing a compartment 16 open at its top, as at 17 (Figure 3). The structure 15 is provided at the top of the compartment 16 with a pair of parallel spaced side rails 18, each preferably in the form of an outwardly facing channel and extending fore and aft. The seat itself is designated by the numeral 19 and is provided with a seat cushion 20 and a back rest 21, the latter being appropriately supported by means 22 which serve to provide arm rests for the seat. The seat is provided at its under portion with a pair of longitudinally extending spaced apart parallel rails 23, each in the form of an inwardly facing channel, the upper flange of which rides on the upper flange of the proximate structure channel 18. The lower flange of each channel 23 turns under, as at 24, to cooperate with the lower flange of the proximate rail 18 to prevent displacement of the seat upwardly from the supporting structure 15.

The upper flange of the left hand channel 23 (as viewed in Figure 2) is provided with a guide portion 25 which is formed by means of a longitudinally extending reverse bend in the flange.

This guide cooperates with a groove 26 provided in the upper flange of the proximate rail 18. In this manner, the supporting structure 15 carries the seat 19 for longitudinal or fore and aft adjustment toward and away from the steering wheel 13.

The seat construction is provided with means for releasably locking the seat in any of several adjusted positions. This means includes a latch, designated generally by the numeral 30, carried by the right hand seat rail 23 and cooperable with the right hand structure rail 18. The latch includes a longitudinally extending hairpin spring 31 secured to the right hand seat rail 23 and extending forwardly to a point where it is apertured to receive a transverse pin 32. The pin extends inwardly and slidably through aligned apertures in a pivoted latching member 33 and in the vertical flange of the right hand rail channel 23, whence it extends further inwardly to be received by any one of a plurality of longitudinally spaced apertures or openings 34 provided in the vertical flange of the proximate structure channel rail 18. In the preferred form of the invention illustrated, the proximate wall of the supporting structure 15 is also provided with a plurality of longitudinally spaced apertures 35 respectively aligned with the apertures 34 for the purpose of increasing the depth of the apertures in the two pieces of material lying adjacent to each other and thus providing a sturdier reception for the inner end of the retractable pin 32.

The pivoting of the latch member 33 on the side rail 23 is accomplished by means of an outwardly turned portion 36 bent outwardly from the vertical flange of the rail 23 (Figure 3). The rear end of the latch member 33 is inserted under the outturned portion 36. The portion 36 thus provides a pocket for receiving the end of the latch member 33, and the member is further carried by the pin 32 as aforesaid. A washer 37 is carried by the pin 32 between the outer face of the latching member 33 and the inner face of the spring member 31. This washer and the pin 32 are drilled diametrically to receive a cotter pin 38, which means prevents accidental displacement of the pin 32 from the latching mechanism and also provides for engagement between the pin 32 and the spring member 31 so that the pin may be moved outwardly by the latching member 33 against the tension of the spring member 31. The pin 32 is normally spring loaded to the position in which it engages a selected one of the openings 34 (being further received in this case by the aligned openings 35).

The right hand rail 23 is further provided with an L-shaped member 40 (Figure 2) having its upper leg secured rigidly to the rail 23 and having its lower leg depending downwardly alongside the spring member 31. The vertical portion of the member 40 is apertured to receive the outer end portion of the pin 32 (Figure 3). Since the member 40 is rigidly carried by the proximate seat rail 23, it provides a stop that limits outward retraction of the pin 32; that is to say, the latching member 33 is operable to retract the pin 32 only until the spring member 31 hits the inner face of the vertical flange of the member 40. This amount of outward movement of the pin 32 is sufficient to retract the inner end of the pin from the selected openings 34, 35. Inasmuch as the pin 32 is spring loaded, it will return to any selected opening upon release of the latching member 33, according to where the seat is positioned.

Figures 2, 4:
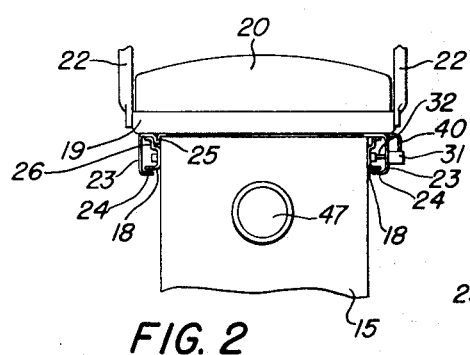
Figure 2 is a fragmentary rear end view of the seat and support.
Figure 4 is a fragmentary view partly in section showing the construction and function of the latch and stop means.

As a safety feature, the construction is provided with means for normally limiting separation of the seat 19 from the supporting structure 15 except in a forward direction. As best shown in Figures 3 and 4, the supporting structure 15 is provided at its rear right hand side with a stop or abutment means 45 disposed between the upper and lower flanges of the right hand structure rail 18 and in position to engage the pin 32 for the purpose of preventing excess movement of the seat 19 rearwardly with respect to the supporting structure 15. As previously stated the member 40 limits outward movement of the pin 32. This limiting of the movement of the pin 32 provides for the retention of the pin 32 in a position always to engage the stop 45 in the event that the seat is moved too far rearwardly (Figure 4). The importance of this arrangement will be appreciated from a consideration of what might occur in the absence of such stop or abutment: Suppose that, while the tractor was in motion, the operator desires to make a rearward adjustment of the seat, in which case he would reach downwardly below the seat 19 and grasp the latching member 33, moving the latter outwardly to retract the pin 32 from the openings 34, 35; he would most likely push rearwardly on the seat to obtain his new position. Without the cooperative abutments provided by the pin 32 and stop 45 the seat would continue rearwardly and would carry the operator with it to the ground, resulting in injury to the operator, especially if the tractor is pulling an implement behind it.

As mentioned above the supporting structure 15 is provided with the open top compartment 16. According to the present disclosure the compartment 16 is utilized for the purpose of housing a storage battery 46. The compartment 16 and opening 17 therein are of such size with respect to the seat 19 that the seat normally covers or closes the compartment, during most adjusted positions of the seat. This result can be best ascertained from an examination of Figure 3 from which it will be seen that the seat is capable of quite a bit of forward or rearward adjustment without uncovering the compartment 16 and consequently without exposing the storage battery 46. The importance of this arrangement lies in the fact that the compartment is not uncovered unnecessarily and consequently the seat in several of its adjusted positions provides a cover normally closing the compartment and preventing damage to the battery or entrance of dirt and other foreign material into the compartment 16. The compartment provides an ideal location for the battery, for heretofore the battery was placed in any one of several positions that interfered with the appearance and maintenance of the tractor, such as positioning of the battery beneath the fuel tank, alongside the operator's station, or on the rear axle housing. In this respect, it is not desired to limit the applicability of the invention to a seat construction which is provided solely for the purpose of housing a storage battery for, obviously, the compartment 16 may be utilized as a tool box or other receptacle, in the event that a storage battery is not provided as part of the tractor equipment.

Another feature of the invention resides in an improved mounting for a lamp 47. It is well known that the rear end structure of a tractor is rather limited with respect to the mounting of accessories. In the event that original equipment of the tractor includes starting and lighting equipment, the supporting structure 15 provides an ideal support for the lamp 47; on the other hand, if the starting and lighting equipment is provided as an accessory, the supporting structure 15 is always available for mounting of a lamp.

The most important features and objects of the invention have been pointed out above. Other objects and features will undoubtedly suggest themselves to those skilled in the art, as will various modifications and alterations in the preferred form of the invention illustrated and described. It is, therefore, not desired to limit the invention to the precise details disclosed.

I claim:

1. A tractor seat construction, comprising supporting structure having an open top compartment; means on said structure providing rail means; a seat carried on said structure over and normally closing said compartment and including rail means associated with and constrained for sliding movement on said structure rail means; one rail means having therein a plurality of latch-pin-receiving openings spaced along the path of sliding movement of said seat relative to said structure; latch means carried by the other rail means and including a spring-loaded retractable pin selectively receivable by and withdrawable from a selected opening to secure the seat in selected positions of adjustment; said structure rail means and seat rail means being of such relative length as to provide for sliding of the seat through a range in which the seat at times uncovers the compartment; and one-way stop means interengageable between the latch means and said one rail means within said range for positively limiting sliding of the seat in one direction to an extent in which the seat maintains its closure effect as respects the compartment but providing for sliding of the seat in the opposite direction to an extent sufficient to uncover the compartment.

2. The invention defined in claim 1, further characterized in that: means are provided for normally preventing retraction of the latch pin beyond the position in which it is engageable with the abutment.

3. In a tractor seat construction or the like having a support element and a seat element carried on and generally horizontally movable relative to the support element selectively in opposite directions along a defined straight-line path, the improvement comprising: a first part fixable to one element and having therein a series of latch-receiving openings spaced apart along the path of movement; an abutment fixed to said first part in addition to the latch-receiving openings and projecting into and at one end of said path of movement; a second part fixable to the other element alongside the first part; a latch on the second part and movably carried thereby for movement inwardly and outwardly to be respectively received by and withdrawn from a selected latch-receiving opening; means on the second part biasing the latch inwardly to be received by such selected opening; an operating member movable on the second part; means connecting the latch to the operating member to effect withdrawal of the latch by said member; stop means on the second part limiting latch-withdrawing movement of the operating member to an extent in which the latch is clear of such selected opening but is in a position to engage the aforesaid abutment so as to prevent relative movement of the support and seat elements in one direction beyond said abutment; and said means that connects the latch to the operating member being releasable to free the latch from said member for additional movement of said latch so as to clear the abutment.

HARRY C. ORRICK, Jr.

REFERENCES CITED

The following references are of record in the file of this patent:

UNITED STATES PATENTS

| Number | Name | Date |
| --- | --- | --- |
| 137,816 | Yost | Apr. 15, 1873 |
| 950,441 | Ekstrand | Feb. 22, 1910 |
| 1,357,743 | Tasman | Nov. 2, 1920 |
| 1,771,987 | Cromwall | Aug. 5, 1930 |
| 1,890,048 | Flintermann | Dec. 6, 1932 |
| 2,001,999 | Bishop | May 21, 1935 |
| 2,014,553 | Browne | Sept. 17, 1935 |
| 2,440,224 | North et al. | Apr. 20, 1948 |